Dec. 8, 1959     D. J. DIMMER     2,916,010
FISHING LINE PROPELLER GUARD
Filed April 26, 1956
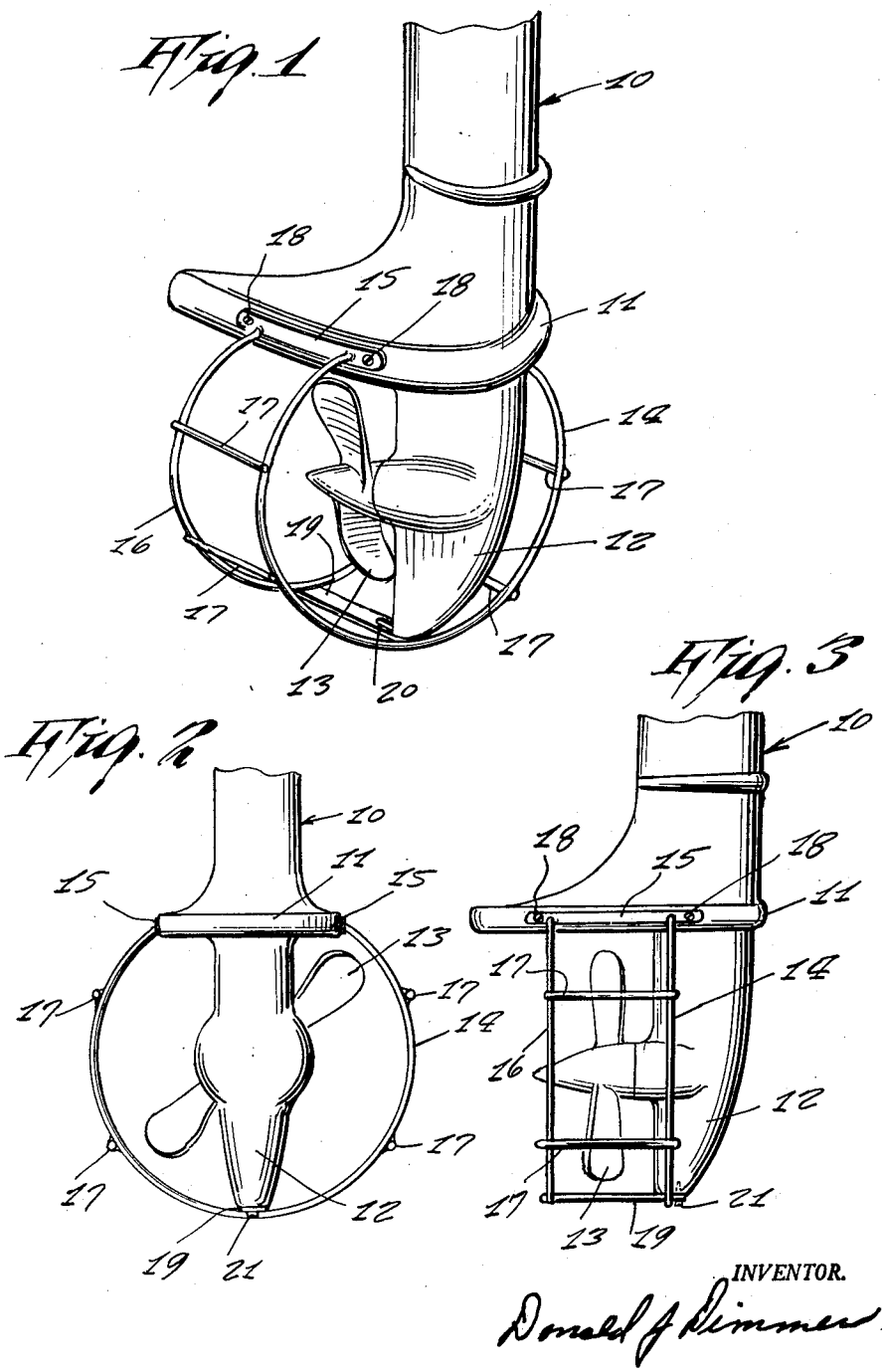
INVENTOR.
Donald J. Dimmer

United States Patent Office 2,916,010
Patented Dec. 8, 1959

2,916,010

FISHING LINE PROPELLER GUARD

Donald J. Dimmer, Alice, N. Dak.

Application April 26, 1956, Serial No. 580,924

3 Claims. (Cl. 115—42)

This invention relates to propeller guards for outboard motors.

It is an object of the present invention to provide a propeller guard for outboard motors which will protect the propeller against fishing lines and other obstructions normally encountered under water.

It is another object of the present invention to provide a propeller guard of the above type which is easily and readily mounted on different types of outboard motors as well as different sizes.

Other objects of the invention are to provide a propeller guard for outboard motors bearing the above objects in mind which is of simple construction, has a minimum number of parts, is inexpensive to manufacture and efficient in use.

For other objects and for a better understanding of the invention, reference may be had to the following detailed description taken in connection with the accompanying drawing, in which:

Figure 1 is a perspective view of a preferred embodiment of the present invention shown in operative use on an outboard motor;

Fig. 2 is a front elevational view thereof and

Fig. 3 is a side elevational view.

Referring now more in detail to the drawing, 10 indicates generally an outboard motor of any suitable type including the usual exhaust pipe flange 11, the fin-shaped lower portion 12 and the propeller 13, substantially as illustrated.

In the practice of my invention a guard is provided for the propeller 13 to protect the same against fishing lines and other under water obstructions and includes a first circular rod 14 of iron or other suitable material, the rod 14 at the upper portion thereof being open and secured at the free ends thereof to the mounting brackets 15 at the front thereof.

A back circular rod 16 of iron or other suitable material, identical in size and shape with the rod 14 is similarly open at the top and secured at the free ends thereof to the mounting bracket 15 at the rear end thereof. Thus, one rod 14 is disposed in front of the propeller 13 and the other rod 16 is disposed to the rear.

The rings 14 and 16 are further connected by the angularly spaced cross rods 17 suitably secured thereto, for example by means of welding.

The brackets 15 at the front and rear thereof are provided with mounting openings and are secured to the sides of the exhaust pipe flange 11 by means of the drilled screws 18.

An elongated rectangular bottom plate 19 of concave or convex transverse cross section (to clear the propeller 13) is welded at opposite ends to the rods 14 and 16 and is provided near its front end with the elongated slot 20 which receives downwardly therethrough the lower end of the screw 21 and the head thereof, the upper end of the screw being screw threaded into the bottom of the fin-shaped portion 12. The screw 21 is adjustable in the slot 20 to accommodate varying types of motors, as will be obvious. Thus, the guard is secured to the motor at three points, namely the opposite sides of the exhaust pipe flange 11 in the lower end of the fin-shaped portion 12 and will protect the propeller 13 against fishing lines as well as under water obstructions of other types without interfering with the flow of water rearwardly through the propeller. The cross rods 17 will retain the rings 14 and 16 rigidly and at the same time will prevent weeds from turning into the propeller. The propeller may be of any suitable type having two, three or four blades, the guard being adapted for various types of such blades. The mounting brackets 15 are adjustable for different sizes and types of motors. The screws 18 will be drilled for any desired position depending on the type of motor.

While various changes may be made in the detail construction, it shall be understood that such changes shall be within the spirit and scope of the present invention as defined by the appended claims.

What I claim as new and desire to protect by Letters Patent of the United States is:

1. A propeller guard for outboard motors comprising, in combination, a first open ring shaped rod, a second open ring shaped rod, a plurality of circumferentially spaced parallel rods connecting said first and second rings, one of said rings being disposed at one side of the propeller and the other of said rings being disposed at the opposite side of said propeller, fastening means for securing the upper ends of said rings to opposite sides of the motor exhaust pipe flange comprising a pair of elongated plates adapted to be positioned against the exhaust pipe flange of the motor on opposite sides thereof, the free ends of said rings being secured to the ends of said plates, and fastening means for securing the ends of said plates to the flange, and adjustable securing means for securing the bottom of said rings to the lower portion of the motor.

2. A propeller guard for outboard motors having a portion thereof secured to the exhaust pipe flange comprising a pair of curved spaced rods which substantially have a common axis, the end portions of each rod being bent inwardly toward one another and spaced sufficiently to allow the exhaust flange to be mounted therebetween, a plurality of elongated spaced connecting rods being generally elongated in the direction of said axis and spaced therefrom for connecting the curved spaced rods and holding said rods in spaced relationship, said connecting rods being sparsely spaced to surround the geometric figure formed by the revolution of the propeller, a pair of elongated plates to be secured to the exhaust flange, said plates connecting the corresponding end portions of each of the curved rods, fastening means for securing said plates to the exhaust pipe flange, and means for securing the portion of the rings opposite the elongated plates to the lower portion of the motor, said portion being located on the opposite side of the propeller shaft from the exhaust flange.

3. The apparatus of claim 2 further characterized in that the means for securing the bottom of said rings to the lower portion of the motor includes a member slideably mounted relative to the curved rods so that it may be adjustably positioned with respect to the motor to which it is connected.

References Cited in the file of this patent

UNITED STATES PATENTS

| 515,405 | Meston | Feb. 27, 1894 |
| 1,355,145 | Hoffine | Oct. 12, 1920 |
| 2,136,628 | Lundell | Nov. 15, 1938 |
| 2,362,323 | Stoppel | Nov. 7, 1944 |
| 2,551,371 | Grigg | May 1, 1951 |